US006767068B1

(12) United States Patent
Fujii et al.

(10) Patent No.: US 6,767,068 B1
(45) Date of Patent: Jul. 27, 2004

(54) DUAL RECLINING DEVICE FOR VEHICLE SEAT

(75) Inventors: Harutoshi Fujii, Tokyo (JP); Toshimitsu Kimura, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/438,829

(22) Filed: May 16, 2003

(51) Int. Cl.[7] .............................................. A47B 97/00
(52) U.S. Cl. ............... 297/463.1; 297/408; 297/354.12; 297/361.1
(58) Field of Search ............................ 297/354.12, 363, 297/364, 408, 361.1, 362.12, 463.1, 463.2

(56) References Cited

U.S. PATENT DOCUMENTS

| | | | | |
|---|---|---|---|---|
| 3,695,700 A | * | 10/1972 | Flach | 297/408 |
| 4,008,920 A | * | 2/1977 | Arndt | 297/361.1 |
| 4,470,633 A | | 9/1984 | Fourrey et al. | |
| 4,909,572 A | | 3/1990 | Kanai | |
| 5,322,341 A | * | 6/1994 | Harrison et al. | 297/94 |
| 5,516,198 A | * | 5/1996 | Yokoyama | 297/362 |
| 5,718,483 A | * | 2/1998 | Yamaguchi et al. | 297/367 |
| 6,007,153 A | * | 12/1999 | Benoit et al. | 297/378.12 |
| 6,012,776 A | * | 1/2000 | Schneider et al. | 297/378.12 |
| 6,033,017 A | * | 3/2000 | Elqadah et al. | 297/216.1 |
| 6,045,181 A | * | 4/2000 | Ikeda et al. | 297/216.12 |
| 6,543,849 B1 | * | 4/2003 | Yamada | 297/363 |
| 6,561,587 B2 | * | 5/2003 | Elio et al. | 297/374 |

FOREIGN PATENT DOCUMENTS

| | | |
|---|---|---|
| JP | 11-192134 A | 7/1999 |
| JP | P3370122 B2 | 11/2002 |
| JP | 2003-24163 A | 1/2003 |

* cited by examiner

*Primary Examiner*—Peter M. Cuomo
*Assistant Examiner*—Erika Garrett
(74) *Attorney, Agent, or Firm*—Browdy and Neimark, P.L.L.C.

(57) ABSTRACT

A dual reclining device comprising a pair of reclining elements provided on both lateral sides of an automotive seat, with a tubular connecting rod being connected with two shafts respectively of those two reclining elements. The tubular connecting rod has an L-shaped end portion having a longitudinal pressed region and a transverse flange portion, wherein a hole is formed in the transverse flange portion. One of the two reclining element shafts is inserted through such hole of transverse flange portion and welded thereto, while being also welded to the longitudinal pressed region of transverse flange portion. Such easy welding is effective in absorbing both longitudinal and radial errors or non-alignment between the two shafts.

2 Claims, 2 Drawing Sheets

DUAL RECLINING DEVICE FOR VEHICLE SEAT

BACKGROUND OF THE INVENTION

1. Field of the Invention

The present invention relates to a reclining device for a vehicle seat. In particular, the invention is directed to a dual reclining device so designed that a pair of reclining elements are respectively provided to the two lateral sides of vehicle seat, with a connecting rod being operatively connected between the two reclining elements, wherein an operation lever is provided to one of the two reclining elements, and, by rotating the operation lever, a rotation as well as a locking/unlocking operation are imparted to one reclining device from the lever, while being simultaneously imparted to another reclining element at the same time via that connecting rod, for the purpose of adjustably inclining a seat back of the seat.

2. Description of Prior Art

There have been known various dual reclining devices of this kind, including a dual reclining device disclosed in the U.S. Pat. No. 4,909,572 for instance.

A typical construction of the dual reclining device is such that a pair of first and second reclining elements, each having a locking mechanism therein, are provided to the respective two lateral sides of a vehicle seat frame, wherein, for instance, the first reclining element only includes one operation lever, and that a connecting rod is operatively connected between the first and second reclining elements in order that rotation or locking and unlocking operations of the operation lever are impaired via that connecting rod to both of the first and second reclining elements at the same time.

In this dual reclining device, each of the first and second reclining elements has an upper arm and a lower base arm (see the designations 20A, 20B, 21A, 21B in FIGS. 1 and 2 for instance) In other words, the two upper arms of dual reclining device are connected with the two lateral fame portions of a seat back frame, respectively; whereas the two lower base arms thereof are connected with a seat cushion or a seat slide device. Each upper arm is roatably connected with each lower base arm via one end of the connecting rod. Hence, the upper arm is rotatable about both two ends of connecting rod or a center of rotation between the upper arm and lower base arm. It follows that one end of the connecting rod is disposed in one rotation center between the upper and lower base arms associated with the first reclining element, whereas another end of the connecting rod is disposed in another rotation center between the upper and lower base arms associated with the second reclining element.

In this particular dual reclining device, a widely available typical mode of the foregoing connecting rod is a tubular connecting rod having a non-circular end of a rectangular cross-section, for instance, and a circular end of a circular cross-section. On the other hand, for instance, the first and second reclining elements in the dual reclining device are respectively provided with a shaft having a non-circular end portion of rectangular cross-section and a shaft having a circular end portion of circular cross-section. Therefore, after having assembled both first and second reclining elements with a seat cushion frame and a seat back frame, the rectangular shaft end portion of first reclining elements is inserted and welded in the corresponding rectangular end of connecting rod, and then, the circular shaft end portion of second reclining element is inserted and welded in the corresponding circular end of connecting rod, whereby both first and second reclining elements are operatively connected together by the connecting rod.

In this process of forming the dual reclining device, it is quite often the case that the shaft of the first reclining element is not coaxially aligned with the shaft of the second reclining element. In that case, both first and second reclining elements can hardly be rotated simultaneously by the operation lever, and, technically, it would be difficult to extend the connecting rod on a rectilinear line between the first and second reclining element shafts. That is, a dislocation or non-alignment occurs between a central axis of the first reclining element and a central axis of the second reclining element. Considering such structural error or non-alignment, it has been a normal practice that an inner bore of the circular end of the tubular connecting rod is formed to have an inner diameter slightly larger than the circular shaft end portion of the connecting rod. Thus, when inserting the shaft end portion of second reclining device into the bore of connecting rod circular end, a certain play space is given peripherally of that shaft end portion so as to absorb an amount of error or non-alignment between the central axis of first reclining element and the central axis of second reclining element. Thereafter, a welding is effected to firmly connect the second reclining element shaft end portion with the connecting rod. However, it is very troublesome and difficult for a worker to position the circular end portion of second reclining element shaft at a predetermined point within the bore of corresponding circular end portion of connecting rod and weld the former with the latter precisely, which inevitably requires a separate support member or special aid means for that welding purpose.

SUMMARY OF THE INVENTION

In view of the above-stated drawbacks, it is a primary purpose of the present invention to provide an improved dual reclining device which permits both two end portions of connecting rod to be easily welded to two shafts of dual reclining device, irrespective of axial non-alignment between those two shafts.

In order to achieve such purpose, in accordance with the present invention, there is basically provided a dual reclining device in combination with a seat framework of vehicle seat including a seat back fame, the dual reclining device comprising:

a first reclining means provided on one lateral side of the seat framework, the first reclining means having a shaft;

a second reclining means provided on another lateral side of the seat framework, the second reclining means having a shaft;

both of the first and second reclining means being adapted for adjustably inclining the seat back frame;

a tubular connecting rod including:

one end portion have a bore in which the shaft of the first reclining means is fixed; and a pressed and bent end portion of "L" shape which has a pressed region extending a longitudinal direction thereof and a transverse flange portion extending by a right angle from the pressed region, said transverse flange portion having a hole formed therein, and the tubular connecting rod being connected between the first and second reclining means in such a manner that the shaft of second reclining means is not only inserted through and welded to the hole of transverse flange portion associated with the pressed and bent end portion, but also welded to the pressed region of pressed and bent end portion.

Accordingly, a welding can easily be effected not only to a point between the hole of transverse flange portion and the shaft of the second reclining means, but also to a point between the pressed region and that particular second reclining means shat, so that the connecting rod is set in a position between the two shafts respectively of the first and second reclining means.

In one aspect of the invention, the pressed region may be of an arcuate cross-section having a concave inward surface, and one side of the shaft be disposed in the concave inward surface of the pressed region and welded thereto. And, a diameter of the hole of transverse flange portion is larger than an outer diameter of the shaft of second reclining means, thereby absorbing or compensating for longitudinal and radial errors (non-alignment) between those two shafts respectively of the first and second reclining means.

Other features and advantages of the present invention will become apparent from reading of the description hereinafter, with reference to the annexed drawings.

DETAILED DESCRIPTION OF PREFERRED EMBODIMENT OF THE INVENTION

Referring to FIGS. 1 to 5, there is illustrated a preferred mode of dual reclining device in accordance with the present invention.

Figure 1:
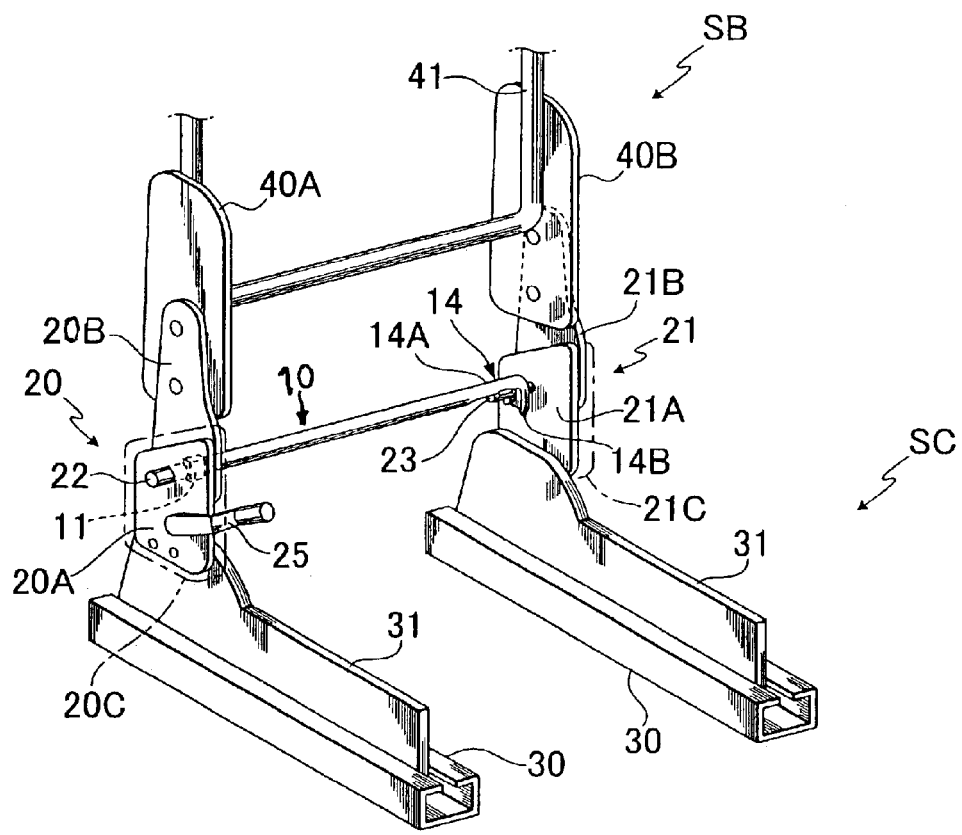
FIG. 1 is a partly broken perspective view of a seat framework in which a dual reclining device having a connecting rod of the present invention is provided.

FIG. 1 shows a vehicle seat framework having the dual reclining device provided therewith. As roughly illustrated, the seat framework itself is well known and comprised of a known seat back frame (SB) and a seat cushion frame (SC) having a pair of base frame portions (31) (31) which are respectively connected with a pair of known slide rail devices (30), as known in the art. As far as the present embodiment is concerned, the dual reclining device is provided between the seat back frame (SB) and the seat cushion frame (SC). This is of course one exemplary mode of known dual reclining device and is not limitative.

The dual reclining device is basically of a known structure, excepting a connecting rod (10) which is a principal part of the present invention. As shown, the dual reclining device comprises a first reclining element (20) and a second reclining element (21), thereby constituting a dual reclining construction. The first reclining element (20) includes a lower base arm (20A) and an upper arm (20B) rotatably connected, via a shaft (22), with the lower base arm (20A). Precisely stated, the upper arm (20B) is fixed to the shaft (22) at the lower region thereof, and the shaft (22) is rotatably supported in the lower base arm (20A), so that the upper arm (20B) is free to rotate forwardly and backwardly relative to the lower base arm (20A). Designation (21C) indicated by the one-dot chain line stands for a cover of the first reclining element (20) as normally known in the art. Likewise, the second reclining element (21) includes a lower base arm (21A) and an upper arm (21B) rotatably connected, via a shaft (23), with the lower base arm (21A). That is, the upper arm (21B) is fixed to the shaft (23) at the lower region thereof, with the shaft (23) being rotatably supported in the lower base arm (21A), so that the upper arm (21B) is free to rotate forwardly and backwardly relative to the lower base arm (21A). Designation (21C) indicated in the one-dot chain line stands for a cover of that second reclining element (21). It is noted that only the first reclining element (20) has an operation lever (25) provided on the lower base arm (20A) for locking an unlocking the upper arm (20B). This is a well known mechanism and any further description is omitted thereon. The construction of both dual reclining device and seat framework is disclosed for example from the U.S. Pat. Nos. 4,470,633 and 4,909,572, and therefore, any further description is omitted thereon.

In brief, referring again to FIG. 1, the lower base arm (20A) of the first reclining element (20) is fixedly connected with a rearward region of one base frame portion (31) of seat cushion frame (SC), while on the other hand, the lower base arm (21A) of the second reclining element (21) is fixedly connected with a rearward region of another base frame portion (31) of seat cushion frame (SC). As is known, the seat back frame (SB) is formed from a tubular material in the illustrated manner, comprising a pair of lateral frame portions (41) (41) and a pair of side frame cover members (40A) (40B) attached to the respective two lateral frame sections (41) (41). Also, as can be seen from FIGS. 2 and 3, it is known in the art that the shaft (22) of the first reclining element (20) has a non-circular end portion (22A) of a rectangular cross-section, as disclosed from the U.S. Pat. No. 4,470,633 for example.

As shown, the first reclining element (20) is at the upper arm (20B) thereof fixedly connected with the corresponding side frame cover member (40A), whereas the second reclining element (21) is at the upper arm (21B) thereof fixedly connected with the corresponding side frame cover member (40B).

In the dual reclining device of this kind, the mutually faced two shafts (22) (23) respectively of the first and second reclining elements (20) (21) are normally in a coaxially aligned relation with each other. But, in a practical process of assembling the dual reclining device with the seat framework, it is often the case that some slight structural errors occur among the interconnected constituent members and parts between the dual reclining device and seat framework. As a result thereof, the following two aspects of errors are caused: (i) the first and second reclining element shafts (22) (23) are dislocated from each other a certain amount in one of diameter-wise or radial directions relative to a center at which both central axes of the two shafts (22) (23) should have been aligned with each other (thus, they are out of coaxial alignment with each other), thereby causing a certain amount of radial error (non-alignment) between the two shafts (22) (23), and (ii) the two shafts (22) (23) are dislocated toward or away from each other along their respective longitudinal axes, which creates a varied distance between the two shafts (22) (23), thereby causing a certain amount of longitudinal error therebetween.

To solve such error problem, in accordance with the present invention, there is provided a tubular connecting rod (10) which has an L-shaped end portion (14) defined therein.

Figure 3:
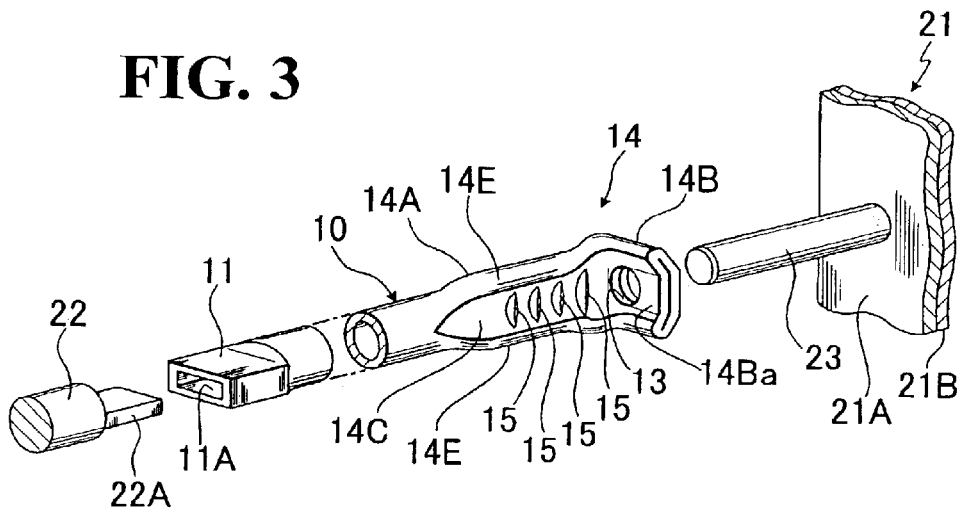
FIG. 3 is a partly broken, exploded perspective view of the connecting rod and principal part of the invention.
Figure 4:
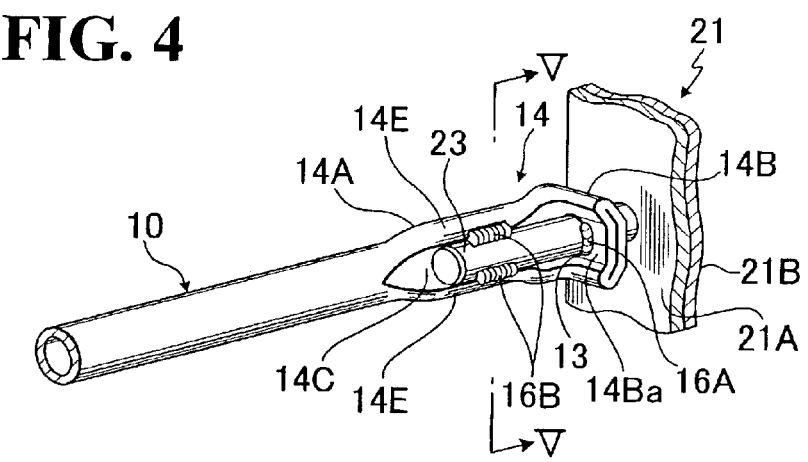
FIG. 4 is a partly broken perspective view showing the state where one end portion of the connecting rod is welded to a shaft of reclining element of the dual reclining device.
Figure 5:
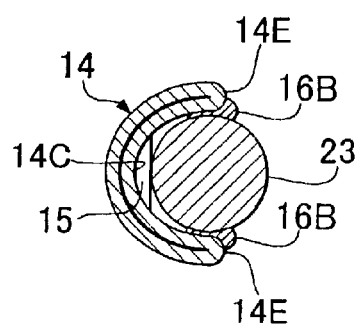
FIG. 5 is a sectional view taken along the line V—V in FIG. 4.

As shown in FIG. 3, the connecting rod (10) also has a known non-circular end portion (11) of a rectangular cross-section. Designation (11H) denotes a rectangular hole defined in that non-circular end portion (11). As is known, the non-circular end portion (11) of connecting rod (10) is connected with the shaft (22) of the first reclining element (20) by inserting and welding the rectangular end portion (22A) of that shaft (22) in the corresponding rectangular hole (11A) of connecting rod (10).

In accordance with the present invention, the foregoing L-shaped end portion (14) of connecting rod (10) is capable of connection with the circular shaft (23) of second reclining device (21) in such a manner as to absorb or compensate for the above-discussed radial and longitudinal errors (non-alignment) between the two shafts (22) (23).

Figure 2:
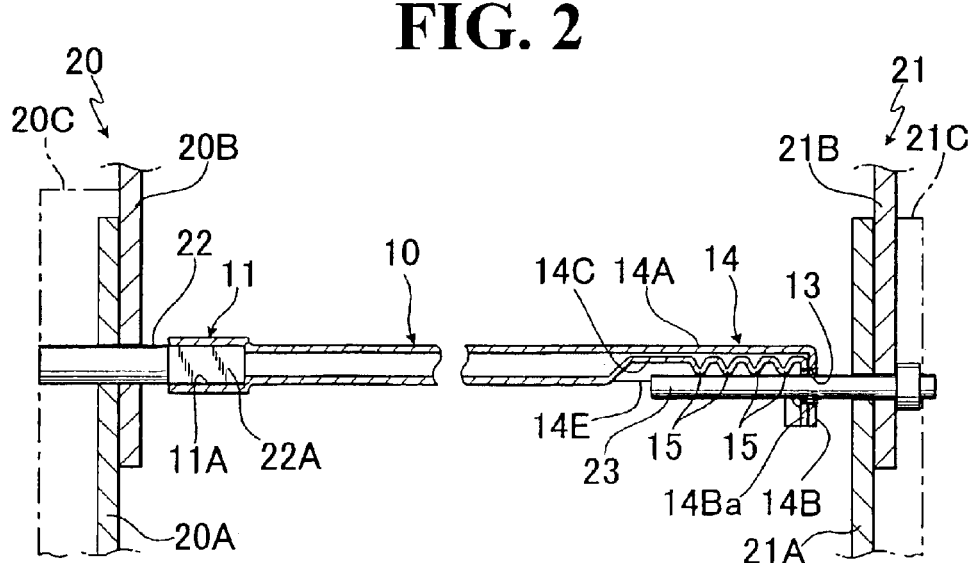
FIG. 2 is a partly broken sectional view showing a principal part of the present invention.

Formation of that L-shaped end portion (14) is basically such that, firstly, the corresponding certain original tubular region of connecting rod (10) is pressed into a gutter-like pressed region (at 14A) of an arcuate cross-section, and then, a certain end region of such gutter-like pressed portion is further pressed into a substantially flat shape and bent at a right angle from the gutter-like pressed region, thereby forming a transverse flange portion (at 14B) which has a connecting hole for allowing insertion of the circular shaft (23) thereinto. That is, as shown in FIGS. 2 and 3, such L-shaped end portion (14) comprises: a longitudinal gutter-like pressed region (14A) of an arcuate cross-section which extends along a longitudinal axis of the connecting rod (10); and a transverse flange portion (14B) extending at a right angle from the gutter-like pressed region (14A) in a direction transversely of the longitudinal axis of connecting rod (10). The transverse flange portion (14B) is formed with a circular connecting hole (13) therein.

It is important to note that the inner diameter of the connecting hole (13) is slightly larger than the outer diameter of the circular shaft (23) and the gutter-like pressed region (14A) is greater in length than the projected portion of the shaft (23) which projects outwardly from the lower base arm (21A) of second reclining element (21).

Designation (14C) denotes an concave inward surface of the gutter-like pressed region (14A). Designation (15) stands for a plurality of small reinforcement ribs formed in that concave inward surface (14C) to reinforce the gutter-like pressed region (14A).

In assembly, at first, the non-circular end portion (11) of the connecting rod (10) is connected with the shaft (22) of first reclining element (20) by inserting and welding the rectangular end portion (22A) of that shaft (22) in the rectangular hole (11H) of the connecting rod end portion (11). Thereafter, the columnar shaft (23) of second reclining element (21) is inserted through the circular connecting hole (13) of the transverse flange portion (14B) of connecting rod (10). Next, as understandable from FIG. 4, one peripheral side of the columnar shaft (23) may be contacted with the concave inward surface (14C) of the gutter-like pressed region (14A) of connecting rod (10).

At this point, the fact that the diameter of the circular connecting hole (13) is greater than the outer diameter of the columnar shaft (23) is effective in compensating for an amount of the above-stated radial error (or axial non-alignment) between the first reclining element shaft (22) and the second reclining element shaft (23). Further, the fact that the gutter-like pressed region (14A) is longer than the shaft (23) of second reclining element (21) is effective in compensating for the above-stated longitudinal error between those two shafts (22)(23). With such structure, it is possible to absorb both of those radial and longitudinal errors between the two shafts (22) (23) which frequently occurs in assembling the reclining device with the seat framework. Therefore, by simply inserting the shaft (23) through the connecting hole (13), a worker can locate the L-shaped end portion (14) of connecting rod (10) relative to the second reclining element shaft (23) at a proper point that compensates for amounts of the radial and longitudinal errors.

Then, after having inserted the shaft (23) through the connecting hole (13), a welding is effected to one local point between the shaft (23) and the connecting hole (13), as indicated by the designation (16A). By such one point welding, an optimum position of the connecting rod (10) is easily and finally determined between the non-aligned two shafts (22) (23), thereby insuring to allow smooth rotation of the connecting rod (10) connected between the two shafts (22) (23) without any interruption due to the radial and longitudinal errors stated above. Under that state, the shaft (23) extends alongside of the concave inward surface (14C) of gutter-like pressed region (14A). Otherwise stated, the gutter-like pressed region (14A) extends alongside of the shaft (23) in such a manner as to substantially embrace a half peripheral side of the shaft (23), with the two edges (14E) (14E) thereof being disposed on the opposite sides of and adjacent to shaft (23). Then, as indicated by the two designations (16B) (16B) in FIGS. 4 and 5, welding is effected to one point between the one edge (14E) and one side of shaft (23) and also effected to another point between another second edge (14E) and another side of shaft (23). In that way, the L-shaped end portion (14) of connecting rod (10) is firmly welded and connected with the shaft (23). It is therefore appreciated that welding can be quickly and directly effected to such three points between the shaft (23) and connecting rod (10) without any other separate elements and aid means for that welding operation, and that such simple three-point welding is sufficient to retain a normal strength of the connecting rod (10) and allow smooth rotation of the connecting rod (10), thus insuring a synchronized operation of both first and second reclining elements (20) (21) by rotating the operation lever (25).

It should be understood that the present invention is not limited to the illustrated embodiment, but any modification, replacement and addition may be applied thereto without departing from the appended claims.

What is claimed is:

1. A dual reclining device in combination with a seat framework of vehicle seat including a seat back fame, comprising;

a first reclining means provided on one lateral side of said seat framework, said first reclining means having a shaft;

a second reclining means provided on another lateral side of said seat framework, said second reclining means having a shaft;

both of said first and second reclining means being adapted for adjustably inclining said seat back frame;

a tubular connecting rod including:

one end portion have a bore in which said shaft of said first reclining means is connected; and a pressed and bent end portion of "L" shape which has a pressed region extending a longitudinal direction thereof and a transverse flange portion extending by a right angle from said pressed region, said transverse flange portion having a hole formed therein, and wherein said pressed region is larger in length than said shaft of said second reclining means, and a diameter of said hole of said transverse flange portion is larger than an outer diameter of said shaft of said second reclining means, thereby allowing said shaft of said second reclining means to be inserted through said hole and contacted on said pressed region at a point to absorb radial any longitudinal errors between said shaft of first reclining means and said shaft of said second reclining means, and said tubular connecting rod being connected between said first and second reclining means in such a manner that said shaft of said second reclining means is inserted through and welded to said hole of said transverse flange portion associated with said pressed and bent end portion, and welded to said pressed region of the pressed and bent end portion.

2. The dual reclining device as claimed in claim 1, wherein said pressed region is of an arcuate cross-section having a concave inward surface, and wherein one side of said shaft is disposed in said concave inward surface of the pressed region and welded thereto.

* * * * *